(12) United States Patent
Stroila

(10) Patent No.: US 9,756,138 B2
(45) Date of Patent: Sep. 5, 2017

(54) DESKTOP APPLICATION SYNCHRONIZATION TO PROCESS DATA CAPTURED ON A MOBILE DEVICE

(71) Applicant: Navteq B.V., Veldhoven (NL)

(72) Inventor: Matei Nicolae Stroila, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 92 days.

(21) Appl. No.: 13/858,399

(22) Filed: Apr. 8, 2013

(65) Prior Publication Data

US 2014/0304321 A1 Oct. 9, 2014

(51) Int. Cl.
*G06F 15/16* (2006.01)
*H04L 29/08* (2006.01)
*H04L 29/06* (2006.01)

(52) U.S. Cl.
CPC ............ *H04L 67/18* (2013.01); *H04L 67/38* (2013.01)

(58) Field of Classification Search
CPC .............. H04L 29/08072; H04L 29/06; H04L 29/0809; H04L 29/06047; G06Q 30/02
USPC ........................................................ 709/203
See application file for complete search history.

(56) References Cited

U.S. PATENT DOCUMENTS

| | | | | |
|---|---|---|---|---|
| 5,852,810 A * | 12/1998 | Sotiroff et al. | ............... | 705/26.8 |
| 5,898,902 A * | 4/1999 | Tuzov | ........................ | 455/13.1 |
| 5,936,631 A * | 8/1999 | Yano et al. | ................... | 345/428 |
| 5,956,716 A * | 9/1999 | Kenner et al. | | |
| 6,763,148 B1 * | 7/2004 | Sternberg et al. | ............ | 382/293 |
| 7,366,840 B2 | 4/2008 | Tapola | | |
| 7,610,331 B1 * | 10/2009 | Genske et al. | ................ | 709/202 |
| 7,847,729 B2 * | 12/2010 | Tysowski et al. | ........ | 342/357.62 |
| 7,917,286 B2 * | 3/2011 | Taylor et al. | .................. | 701/468 |
| 7,962,128 B2 * | 6/2011 | Neven | ..................... | G06K 9/228 455/3.01 |
| 8,060,389 B2 * | 11/2011 | Johnson | ................ | H04L 69/329 705/6 |
| 8,229,464 B1 * | 7/2012 | Wu | ............................ | 455/456.1 |
| 8,238,671 B1 * | 8/2012 | Babenko | ............ | G06K 9/00671 382/224 |
| 8,417,000 B1 * | 4/2013 | Mendis | .............. | G06K 9/00671 382/118 |

(Continued)

OTHER PUBLICATIONS

Bo A, Doc Beautifier, Accessed Mar. 6, 2013, Dropbox Wiki.

(Continued)

*Primary Examiner* — Vivek Srivastava
*Assistant Examiner* — Atta Khan
(74) *Attorney, Agent, or Firm* — Lempia Summerfield Katz LLC

(57) ABSTRACT

In one embodiment, a mobile device and another computer operate in tandem through a cloud synchronization service to analyze image data and provide a location based service to a user. A mobile application receives image data and stores the image data in a cloud service format. The cloud synchronization service sends the image data to a desktop application on the other computer. The desktop application analyzes the image data to generate an image attribute. The cloud synchronization service sends the image attribute data to the mobile application. The mobile application provides at least one location based service based on the image attribute. The mobile application may be an augmented reality application.

6 Claims, 8 Drawing Sheets

(56) References Cited

U.S. PATENT DOCUMENTS

| | | | | |
|---|---|---|---|---|
| 8,421,872 | B2* | 4/2013 | Neven, Sr. | G06F 17/30244 348/222.1 |
| 8,473,544 | B2* | 6/2013 | Sako | G06F 17/30038 709/203 |
| 8,611,592 | B2* | 12/2013 | Wallace | G06K 9/00704 382/103 |
| 8,788,811 | B2* | 7/2014 | Fu et al. | 713/156 |
| 8,793,770 | B2* | 7/2014 | Lim | G06F 21/6209 726/21 |
| 8,832,233 | B1* | 9/2014 | Brin | H04L 29/06476 709/203 |
| 2002/0078198 | A1* | 6/2002 | Buchbinder | H04L 12/24 709/224 |
| 2002/0114454 | A1* | 8/2002 | Hamilton | 380/200 |
| 2003/0141971 | A1* | 7/2003 | Heiken, Jr. | 340/506 |
| 2003/0142364 | A1* | 7/2003 | Goldstone | 358/402 |
| 2003/0220965 | A1* | 11/2003 | Krissell | H04L 67/08 709/203 |
| 2004/0064512 | A1* | 4/2004 | Arora et al. | 709/206 |
| 2006/0047704 | A1* | 3/2006 | Gopalakrishnan | 707/104.1 |
| 2006/0277223 | A1* | 12/2006 | Gupta | G06F 17/30194 |
| 2007/0061245 | A1* | 3/2007 | Ramer | G06F 17/30867 705/37 |
| 2007/0172155 | A1* | 7/2007 | Guckenberger | 382/305 |
| 2008/0082823 | A1* | 4/2008 | Starrett | H04L 9/0825 713/171 |
| 2009/0102859 | A1* | 4/2009 | Athsani | G06F 3/011 345/619 |
| 2010/0191459 | A1* | 7/2010 | Carter | G01C 21/32 701/532 |
| 2010/0260426 | A1* | 10/2010 | Huang | G06F 17/30247 382/218 |
| 2010/0287485 | A1* | 11/2010 | Bertolami et al. | 715/764 |
| 2010/0328344 | A1* | 12/2010 | Mattila et al. | 345/633 |
| 2011/0209201 | A1* | 8/2011 | Chollat | 726/4 |
| 2011/0287811 | A1* | 11/2011 | Mattila | G06K 9/4671 455/566 |
| 2012/0069131 | A1* | 3/2012 | Abelow | 348/14.01 |
| 2012/0086727 | A1 | 4/2012 | Korah et al. | |
| 2012/0135745 | A1* | 5/2012 | Kaplan | 455/456.1 |
| 2012/0256954 | A1* | 10/2012 | Soon-Shiong | G06F 17/3087 345/633 |
| 2013/0018881 | A1* | 1/2013 | Bhatt | 707/736 |
| 2013/0067228 | A1* | 3/2013 | Dewan et al. | 713/171 |
| 2013/0147837 | A1* | 6/2013 | Stroila | G06T 19/006 345/633 |
| 2013/0187952 | A1* | 7/2013 | Berkovich | G01S 5/16 345/633 |
| 2013/0191359 | A1* | 7/2013 | Meadow | G06T 17/05 707/705 |
| 2013/0262862 | A1* | 10/2013 | Hartley | G06F 21/602 713/165 |
| 2014/0281520 | A1* | 9/2014 | Selgas | G06F 21/6209 713/165 |

OTHER PUBLICATIONS

Eduado Cuervo et al., Maui: Making Smartphones Last Longer with Code Offload, Jun. 15-18, 2010, MobiSys, San Francisco, CA.

Ramon Caceres et al., Virtual Individual Servers as Privacy-Preserving Proxies for Mobile Devices, Aug. 17, 2009, MobHeld, Barcelona, Spain.

* cited by examiner

DESKTOP APPLICATION SYNCHRONIZATION TO PROCESS DATA CAPTURED ON A MOBILE DEVICE

FIELD

The following disclosure relates to synchronization of a desktop application with a mobile device to process data captured on a mobile device at the desktop application.

BACKGROUND

Mobile devices may deliver navigation-related and mapping-related applications to users. The applications may employ augmented reality, which combines a physical world view with supplemental information. The physical world view may be generated by a camera integrated with the mobile device and the supplemental information may be information related to objects in the physical world view.

With the increase in available content and services, service providers and device manufacturers face technical challenges in developing mobile devices and applications capable of efficiently providing the content and services to users. For example, computing resources of the mobile device may be substantially consumed to identify objects in the physical world view and deliver the associated supplemental information in augmented reality applications.

SUMMARY

In one embodiment, a mobile device and another computer operate in tandem through a cloud synchronization service to analyze image data and provide a location based service to a user. A mobile application receives image data and stores the image data in a cloud service format. The cloud synchronization service sends the image data to a desktop application on the other computer. The desktop application analyzes the image data to generate an image attribute. The cloud synchronization service sends the image attribute data to the mobile application. The mobile application provides at least one location based service based on the image attribute. The mobile application may be an augmented reality application.

BRIEF DESCRIPTION OF THE DRAWINGS

Exemplary embodiments of the present invention are described herein with reference to the following drawings.

DETAILED DESCRIPTION

In a variety of applications, mobile devices are configured to collect image data and analyze the image data. The image data may be analyzed to identify objects, people, words, or numbers depicted in the image data. The analysis of the image data requires significant computing resources. Offloading the analysis of the image processing to a server involves logistic difficulties. For example, if the server is on a secured network, a port on the network must be opened through the firewall for communication with the mobile device. This may be difficult and undesirable with multiple mobile devices. However, by utilizing a cloud service there is no need to compromise the security of the network because a secure connection need only be made with the cloud service. The following embodiments include a mobile application and a desktop application that operate in tandem through a cloud service such that the analysis of the image data occurs on a desktop computer rather than on the mobile device. The desktop computer is a laptop computer, tower computer, tablet computer, or another type of personal computer. The mobile application and the desktop application may be installed as a single software package. Thus, the mobile application is registered with the desktop application and vice versa. Rather than using a server available to different users in a network for image processing, the personal computer associated with the mobile user assists in providing the augmented reality services.

In one implementation, the cloud service facilitates synchronization between the mobile application and the desktop application. The cloud service maintains a file location in each of the mobile device and the desktop application so that both file locations include the same data. For example, a file location (e.g., a directory or a folder) in the desktop computer corresponds to a specific mobile device. As files are added, removed, or modified in the file location in the desktop application, the cloud service identifies the changes and relays the changes to the mobile device. Likewise, as the mobile application adds, removes, or modifies files, the cloud service identifies the changes and relays the changes to the desktop application. Therefore, as the mobile device takes photographs, the photographs are synchronized on the desktop computer. The desktop application detects the new photographs and analyzes the photographs. The results of the analysis may be sent back to the mobile application. The results may be used to provide location based data to the user. For example, the results may identify a location or point of interest in the photograph. The mobile application may insert a link into the photograph for accessing information related to the location of the point of interest. In alternative embodiments, messaging between the desktop computer and the mobile device is used without a cloud service.

Figure 1:
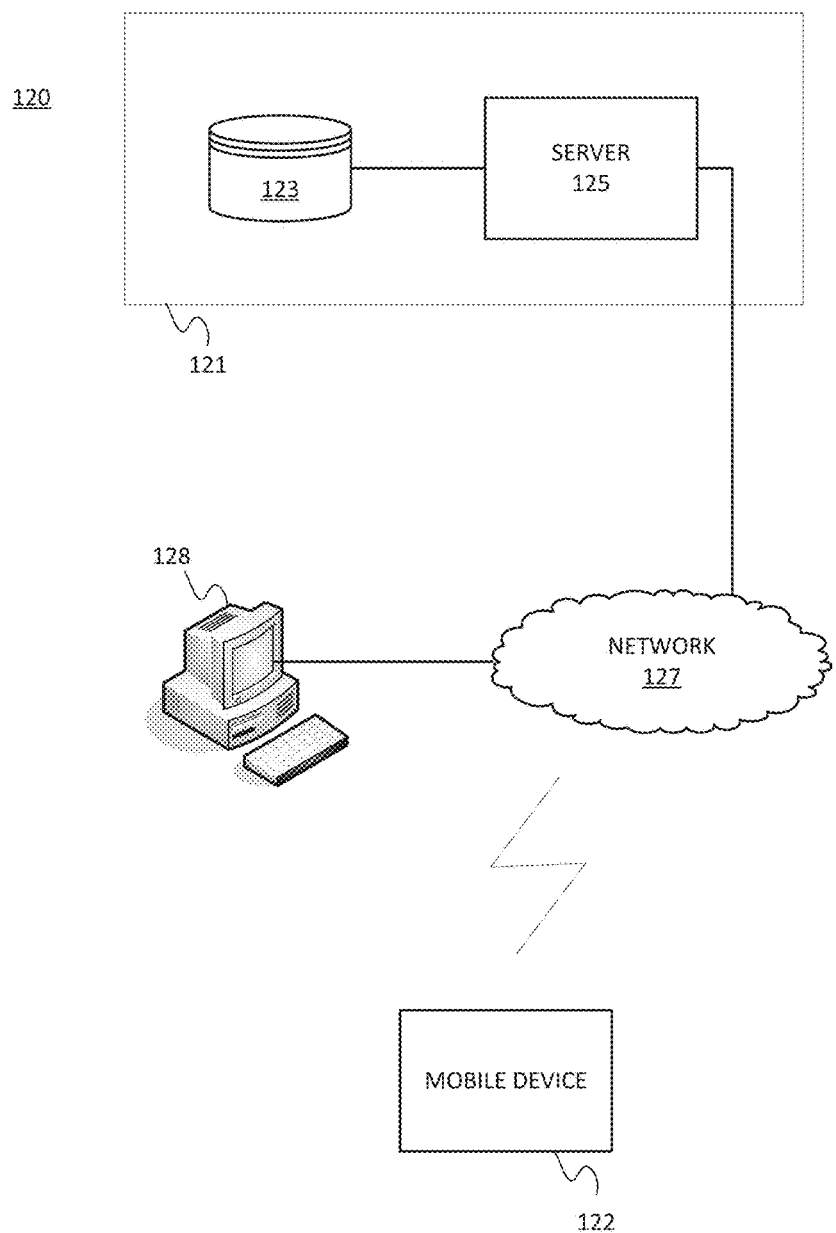
FIG. 1 illustrates an example system for synchronization of a desktop application to process data from a mobile device.

FIG. 1 illustrates an example system 120 for synchronization of a desktop application to process data from a mobile device. The system 120 includes a cloud service 121, a mobile device 122, a workstation 128 (e.g., desktop computer), and a network 127. Additional, different, or fewer components may be provided. For example, many mobile devices 122 and/or workstations 128 connect with the network 127. The cloud service 121 includes a cloud server 125 and a database 123. The cloud server 125 includes at least a communication interface, a controller, and a memory.

The mobile device 122 is configured to collect image data. The image data may be one or more photographs taken with a camera. The image data may be in a graphics format (e.g., bitmap, JPEG, GIF, PNG, TIFF, or another format). The image data may include identifiable objects such as symbols, words, and numbers. The mobile device 122 is configured to execute a mobile application that collects the image data. The mobile application may be an augmented reality application. The augmented reality application may be software that combines images captured with a camera in substantially real time supplemented with data associated with objects in the images. For example, the supplemental data may describe points of interest, navigation instructions, or other data. The mobile application may be a camera application. The mobile device 122 is configured to receive image data captured by the mobile application on the mobile device 122.

The image data is converted to a cloud service format. The cloud service format may include an index appended to the image data. The index may specify the source of the image data. For example, the index may be an identification value that identifies the mobile device 122. Alternatively, the cloud service format may be an encryption technique applied to the image data. The encryption technique may be inaccessible to the cloud service 121. The cloud service 121 may simply facilitate the exchange of the data. For example, the mobile device may generate a key at the mobile device, which is sent to the desktop application. The key may be sent directly from the mobile device to the desktop application. For example, the key may be sent by email or as part of a tandem configuration of the mobile application and the desktop application. The desktop application is configured to access the image data with the key.

The mobile device 122 is configured to send the image data in the cloud service format to the cloud service server 125. The mobile device 122 may package or encapsulate the image data in a communication protocol. Example communication protocols include uniform datagram protocol, Internet protocol, and transmission control protocol.

The cloud synchronization database 123 associates mobile devices 122 and workstations 128. For example, a single workstation 128 may be associated with several mobile devices 122. The cloud service server 125 is configured to query a cloud synchronization database using the index or identification value appended to the image data. The cloud synchronization database 123 returns the IP address of workstation 128. The cloud service server 125 sends the image data to the workstation 128 to synchronize the workstation 128 with the mobile device 122. Alternatively, a message is sent indicating a change in the data available at the database 123.

The workstation 128 also includes a desktop application configured to monitor a file location to identify image data added to the file location from the cloud service 121. The file location includes image data from the mobile device 122. The desktop application is configured to analyze the image data. The analysis may include image recognition. Example image recognition algorithms include scale invariant feature transforms (SIFT), edge detection, speeded up robust features (SURF), edge detection, corner detection, blob detection, feature detection, or another technique. The image recognition algorithm may compare feature vectors of a target image to feature vectors derived from the image data. The image recognition algorithm is configured to identify a predetermined object in the image data. The predetermined object may be a sign, an alphanumeric word, phrase, or character, a symbol, a sign, a doorway, or another object. The predetermined object may be any object that identifies a point of interest, any object that identifies a navigation path or driving instruction, or any object that identifies a street address.

The desktop application is configured to generate an image attribute indicative of the predetermined object and a location that describes a pixel location in the image data of the predetermined object. The image attribute includes data that identifies the predetermined object or links data related to the predetermined object. For example, the image attribute may include a name of the point of interest, a website or uniform resource locator of the point of interest, text or numbers recognized from the image, a door or entrance, or a code for the navigation path, driving instruction, a coupon associated with the point of interest, an advertisement associated with the point of interest, or street address. The desktop application is configured to store the image attribute in the file location, transmit the image attribute, or message about availability of the image attribute.

The cloud server 125 identifies changed data in the file location of the desktop application and relays the changed data to the mobile device 122. The changed data received from the cloud server 125 may include the image attribute and at least one coordinate (e.g., a location of a boundary of the predetermined object in the image) derived from the image data.

The mobile device 122 and mobile application are configured to provide at least one location based service based on the image attribute for the image data and the at least one boundary coordinate. The location based service may provide directions to the street address or point of interest identified from the image data. The location based service may provide information overlaid on image data (e.g., augmented reality). The location based service may provide a data link to information related to the predetermined object. The data link may be a file location or an Internet uniform resource locator associated with the predetermined object (e.g., a website for the point of interest).

The mobile device 122 may position the data link on a display according to the coordinate. A user may select the data link by clicking on, hovering over, or highlighting the graphic at or associated with the coordinate on the image data. The display provides information related to the predetermined object in response to the selection of the data link.

The mobile device 122 is a smart phone, a mobile phone, a personal digital assistant ("PDA"), a tablet computer, a notebook computer, a personal navigation device ("PND"), a portable navigation device, and/or any other known or later developed portable or mobile computing device. The mobile device 122 includes one or more detectors or sensors as a positioning system built or embedded into or within the interior of the mobile device 122. The mobile device 122 receives location data from the positioning system. The workstation 128 includes at least a memory, a processor, and a communication interface.

The cloud service 121, the workstation 128, and the mobile device 122 are coupled with the network 127. The phrase "coupled with" is defined to mean directly connected to or indirectly connected through one or more intermediate components. Such intermediate components may include hardware and/or software-based components.

Figure 2A:
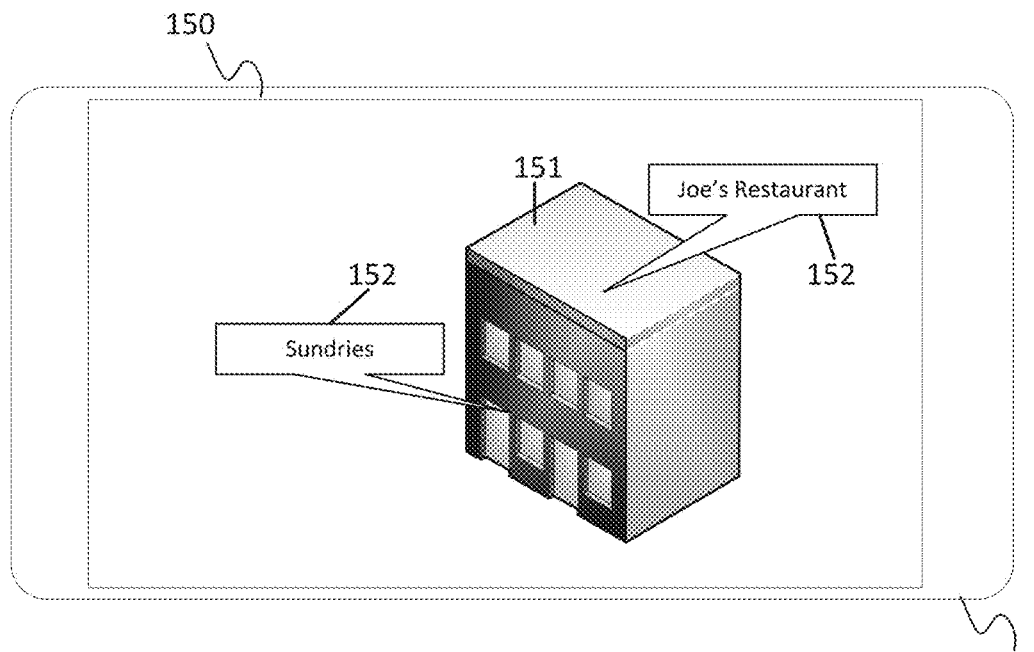
FIG. 2A illustrates an example graphical user interface (GUI) of the mobile device of FIG. 1.

FIG. 2A illustrates an example graphical user interface (GUI) 150 of the mobile device 122. The GUI 150 may be a touchscreen that displays images and receives user inputs. The mobile device 122 may execute an augmented reality application. The augmented reality application may include a camera view in the GUI 150. For example, as shown in FIG. 2A, the GUI 150 illustrates a building 151, which may be referred to as a real world object or a physical object, and augmented by data labels 152. In one example, the mobile device 122 retrieves a three-dimensional location for a data label 152. The mobile device includes position sensors to determine the current location and the orientation of the mobile device 122. Based on the current location and the orientation, the mobile device 122 positions the data label 152 in the GUI in proximity to the building 151.

Figure 2B:
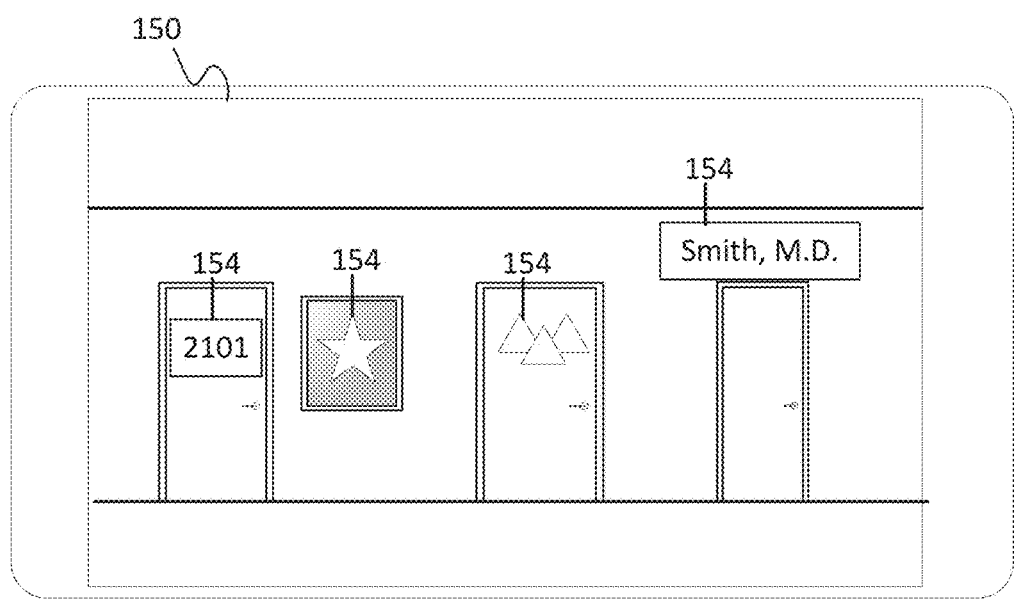
FIG. 2B illustrates another example GUI of the mobile device of FIG. 1.

The augmented reality application may also collect data. The augmented reality application may collect image data that is incidentally captured as the users operate the augmented reality application. FIG. 2B illustrates another example GUI 150 of the mobile device 122 of FIG. 1. The mobile device 122 collects image data including symbols 154. The symbols 154 may include a number (e.g., room number, apartment number, street address, suite number, or another location identified by number), a graphical symbol (e.g., a logo, a trademark, icon, or other graphic), or a word (e.g., name, title, business, company, or another set of alphanumeric characters).

Image data of the symbols 154 are sent to the desktop application by way of the cloud service 121. The desktop application analyzes the image data to identify the symbols 154 and generate supplemental information (e.g., labels 152) for the symbols 154. For example, the supplemental information may include a geographic location or an address for the point of interest indicated by the symbols 154. In another example, the supplemental information may include a website, an email address, or a phone number associated with the location indicated by the symbols 154.

Figure 3A:
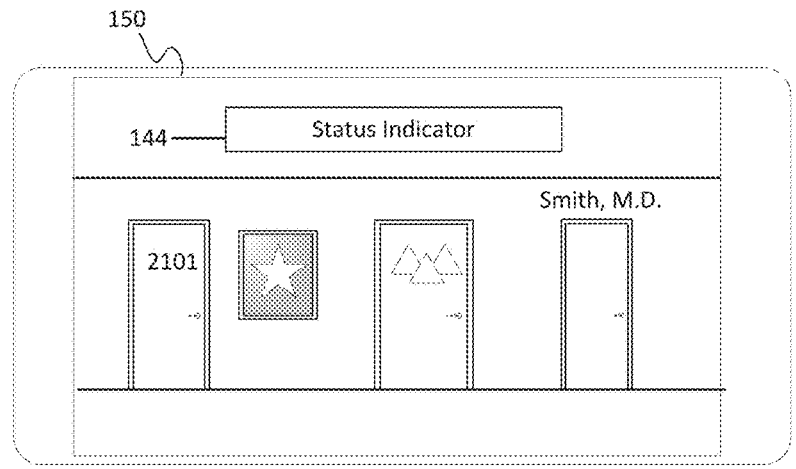
FIG. 3A illustrates another example GUI of the mobile device of FIG. 1.

FIG. 3A illustrates another example GUI 150 of the mobile device 122 of FIG. 1. The GUI 150 may also include a status indicator 144. The status indicator 144 may present a status of the analysis of image data retrieved by the mobile device 122. Multiple statuses are possible. For example, the status indicator 144 may state "data collection" as the mobile device 122 collects data. The status indicator 144 may state "error" or be blank when the viewing area is moving too rapidly to collect quality image data. The status indicator 144 may state "data processing" while the image data has been sent to the cloud server 125 but no results have been returned. The status indicator 144 may state "processing complete" in response to the results of the image analysis have been received at the mobile device 122.

Figure 3B:
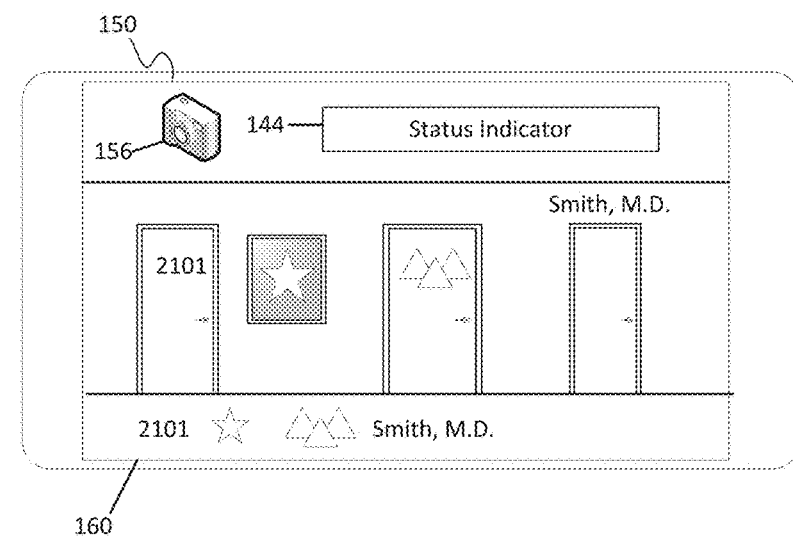
FIG. 3B illustrates another example GUI of the mobile device of FIG. 1.

FIG. 3B illustrates another example GUI 150 of the mobile device 122 of FIG. 1. The GUI 150 may also include an image collection input 156 configured to instruct the mobile device 122 to collect image data. For example, the augmented reality application may display image data continuously but capture data in response to activation of the image collection input 156 from the user.

In addition, the GUI 150 may include a data collection bar 160 that displays the results of the image analysis from the desktop application. The data collection bar 160 may include portions of the image data from which symbols 154 have been identified. The data collection bar 160 may include links to the supplemental data (e.g., websites, directions, reviews, or other data) associated with points of interest identified from symbols 154.

Figure 4:
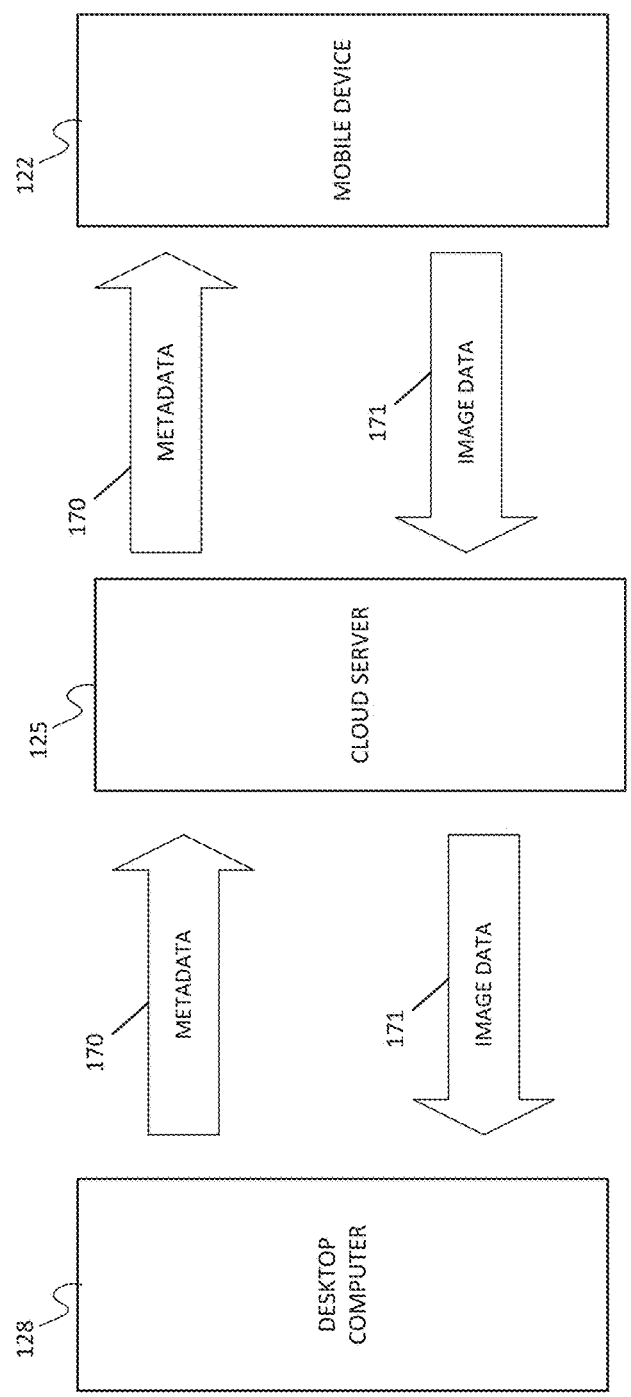
FIG. 4 illustrates example communication in the system of FIG. 1.

FIG. 4 illustrates an example communication in the system of FIG. 1. The desktop computer 128 may be geographically spaced from the mobile device 122. For example, the mobile device 122 may be a smartphone with a camera carried by a user, and the desktop computer 128 may be any type of computer located at the user's home, office, or another location. The desktop computer 128 may also be at a location geographically spaced from the mobile the cloud server 125. The mobile device 122 may also be geographically spaced from the cloud server 125. The term geographically spaced may be defined as spaced at a distance greater that a minimum distance. Example minimum distances may be one meter, 5 meters, 10 meters, or multiple kilometers.

The mobile device generates the image data 171. The cloud server 125 relays the image data 171 to the desktop computer 128. The desktop computer 128 performs an analysis of the image data 171 to generate the metadata 170. The analysis may include a comparison of graphical templates to portions of the image data 171. The graphical templates used may be based on the current location of the mobile device 122. The cloud server 125 relays the metadata 170 to the mobile device 122. The metadata 170 may be returned with image data in a single file. The mobile device 122 provides supplemental information to the user based on the metadata 170.

In one embodiment, more than one cloud server 125 is used. Multiple cloud servers may provide another level of security. When the cloud server 125 includes multiple cloud servers, the image data is broken up by the mobile device 122. One portion of the image data 171 is relayed to the desktop computer 128 by the first cloud server and another portion of the image data 171 is relayed to the desktop computer 128 by a second cloud server. The desktop computer 128 is configured to combine the portions of the image data 171 and analyze the image data 171.

Figure 5:
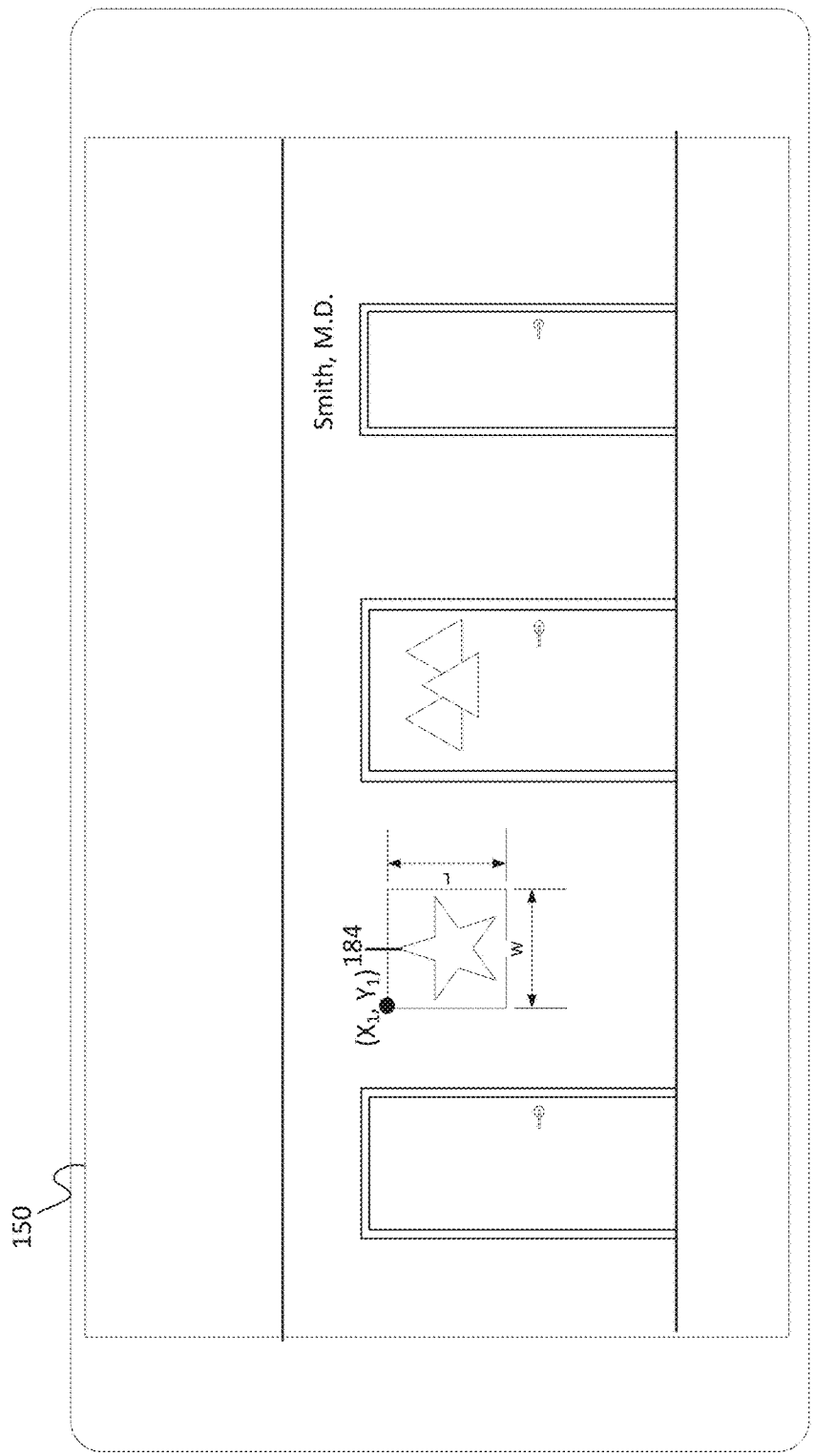
FIG. 5 illustrates another example GUI of the mobile device of FIG. 1.

FIG. 5 illustrates another example GUI 150 of the mobile device of FIG. 1. The GUI 150 includes a symbol 184 that is converted to a link by the mobile device 122. The desktop application analyzes the symbol 184 to determine an image attribute and at least one boundary coordinate. The image attribute include a point of interest or other identification of the symbol 184. The boundary coordinate includes at least one location point for the symbol 184 with the GUI 150. The boundary coordinate may be a pixel location, such as ($X_1$, $Y_1$) as illustrated in FIG. 5. In addition, a size or dimension of the symbol 184 may be included as part of the boundary coordinate or combined with the boundary coordinate. For example, a single pixel location at a known location (e.g., upper-left corner), a width, and a length may describe the symbol 184.

Figure 6:
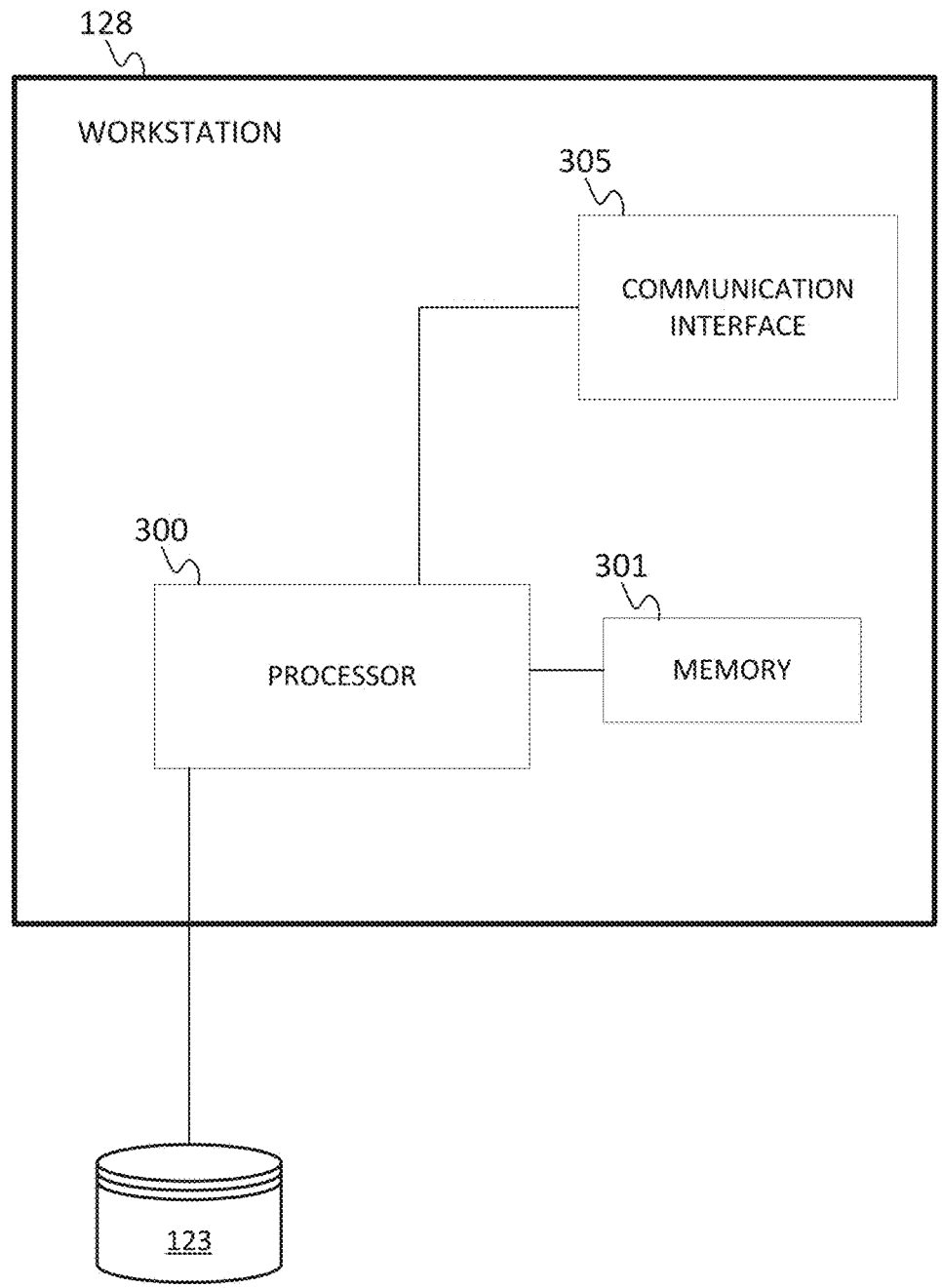
FIG. 6 illustrates an exemplary server of the system of FIG. 1.

FIG. 6 illustrates an exemplary workstation 128 of the system of FIG. 1. The workstation 128 is configured to analyze image data collected by one or more mobile device 122. The workstation 128 includes a processor 300, a communication interface 305, and a memory 301. The workstation 128 may be coupled to a database 123 and a workstation 310. The workstation 128 may include an input device. In addition, the communication interface 305 is an input device for the workstation 128.

The communication interface 305 is configured to receive image data from the cloud service 121. The image data is collected by one or more mobile devices. The image data is automatically synchronized from one or more mobile devices to the workstation 128. The processor 300, which may be any type of controller, is configured to analyze the image data using an image processing algorithm. The image processing algorithm may iteratively process windows of a predetermined size tiled across the image data. The windows may be overlapping or may overlap. The size of the overlap may be variable. The predetermined size may be a square or rectangle measured in pixels or a percentage of the total image. The image processing algorithm may compare the window of image data to a template image or multiple template images. Each template image may correspond to an alphanumeric character or a logo. In addition or in the alternative, the image processing algorithm may include feature detection, edge detection, or character recognition.

Based on the image processing algorithm, the processor 300 is configured to generate at least one image attribute. The image attribute describes an object from the image data identified from the image processing algorithm and/or mobile device location. The image attribute may include the name of a point of interest, the name of an object depicted in the image data, or an address in the image data. The image attribute may include a link to more data related to the image attribute. The image attribute may include navigation instructions to a point of interest or address recognized from the image data.

The processor 300 is configured to store the at least one image attribute at a file location in the memory 301 or database 123 registered with the cloud service 121. The cloud service 123 is configured to synchronize the file location with an associated file location in the mobile device 122.

Figure 7:
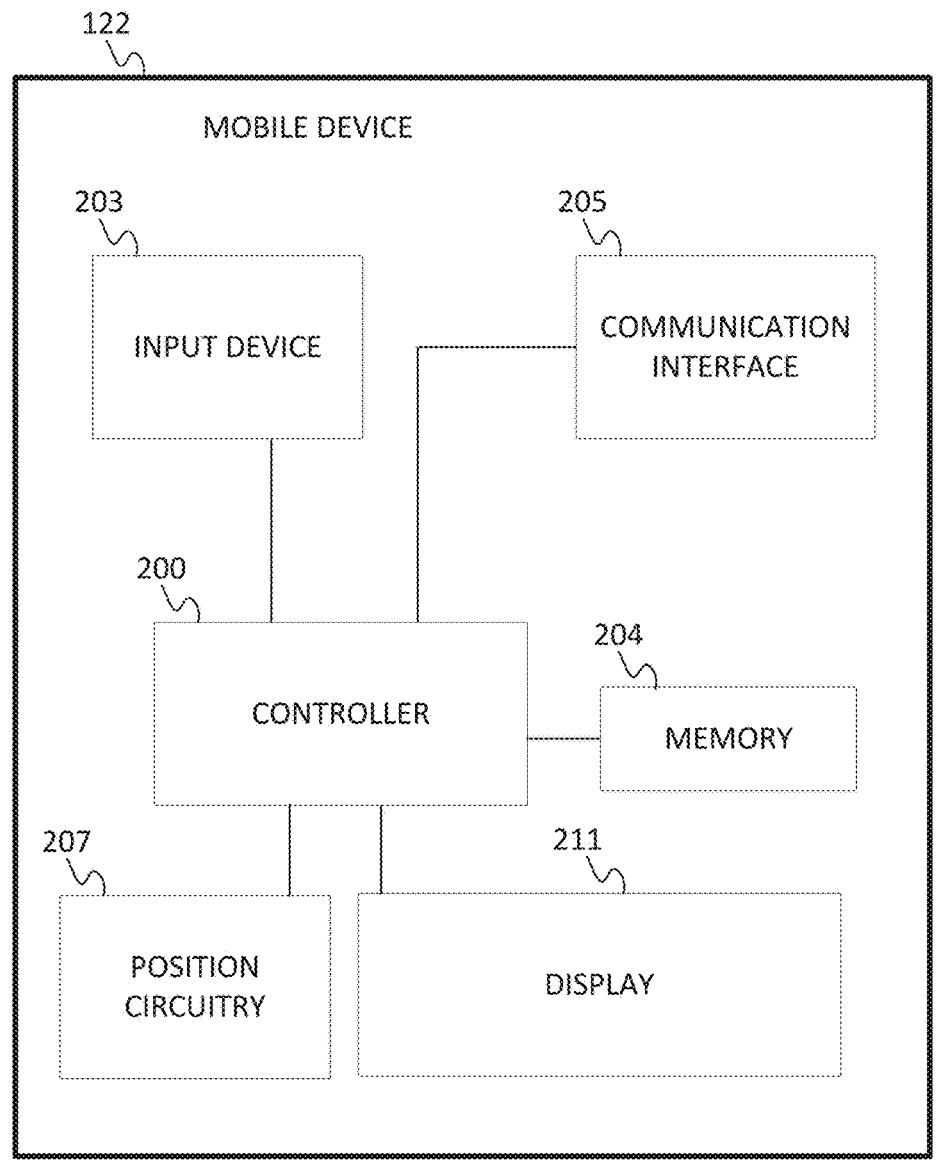
FIG. 7 illustrates an exemplary mobile device of the system of FIG. 1.

FIG. 7 illustrates an exemplary mobile device 122 of the system of FIG. 1. The mobile device 122 includes a controller 200, a memory 204, an input device 203, a communication interface 205, position circuitry 207, a camera 209, and a display 211.

The camera 209 is configured to capture image data. The controller 200 is configured to execute a mobile application for operation of the camera. The mobile application may be any application that controls a camera. The mobile application may be an augmented reality application that combines depictions of physical objects with supplemental data. The mobile application may collect the image data when receiving an input from the user or may periodically or continuously collect image data. The memory 204 is configured to store the image data in a cloud service format. The cloud service format may include a code to identify the mobile application or the mobile device 122.

The communication interface 205 is configured to send the image data to a cloud service server and receive an image attribute for the image data from the cloud service server. The image attribute is determined by a desktop application on another computer and associated with the mobile application using an image processing algorithm.

The controller 200 is configured to provide at least one location based service based on the image attribute for the image data. The location based service may provide information on the objects in the image data. The positioning circuitry 207 generates a location of the mobile device 122. A geographic database is accessed according to the location for map data in the vicinity of the mobile device 122. The map data includes streets, addresses, and points of interest in the vicinity of the mobile device 122.

The location of the mobile device 122 may be coupled with the image data in the cloud service format. The desktop application may filter a set of templates or other match possibilities from the image data using the location of the mobile device 122. In other words, the desktop application may analyze the image data based on possible points of interest only within a predetermined distance of the mobile device 122. Example predetermined distances include 10 meters, 100 meters, 100 yards, or another distance.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Figure 8:
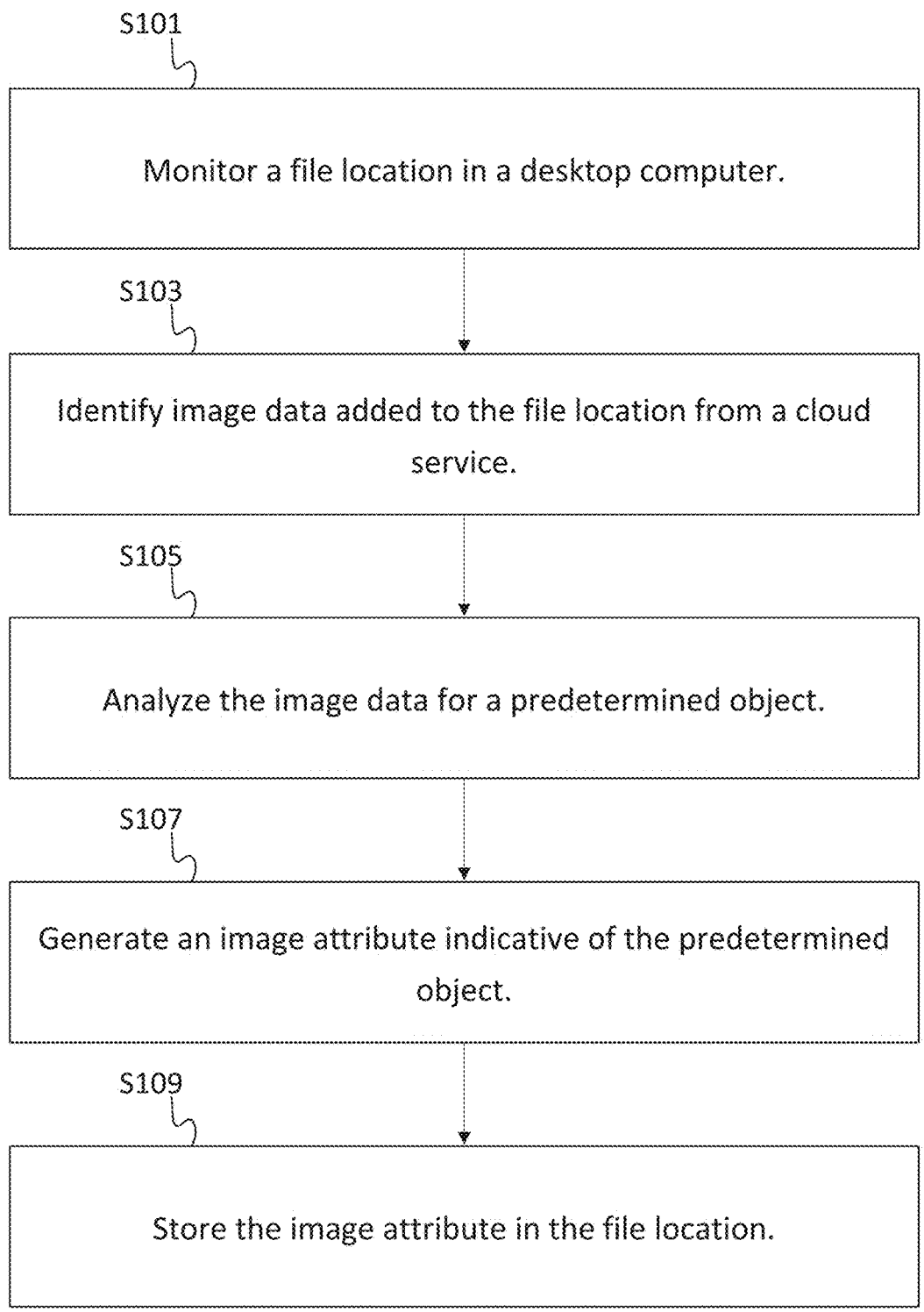
FIG. 8 illustrates another example flowchart for the synchronization of a mobile device and desktop computer.

FIG. 8 illustrates an example flowchart for tandem operation of a mobile application and a desktop application for analyzing image data. While other implementations are possible, the acts of the flowchart may be performed by the workstation 128. Additional, different, or fewer acts may be provided.

At act S101, the desktop application (e.g., workstation 128) monitors a file location in the workstation 128. The file location may be set according to a configuration file. The file location may be in a dropbox or cloud service database in other embodiments.

The configuration file may also identify a mobile device that is synchronized with the desktop computer. The mobile device 122 may be identified according to a username, an internet protocol address, or a network address. Multiple mobile devices 122 may be synchronized with the desktop computer.

At act S103, the desktop application (e.g., workstation 128) monitors the file location and identifies image data added to the file location from a cloud service or the mobile device 122. At act S105, the desktop application (e.g., workstation 128) analyzes the new image data for an object, such as a predetermined object. The predetermined object may be one of a set of image templates or feature vectors. The predetermined object may be an alphanumeric word or another symbol. The predetermined object may be a logo of a business. The predetermined object may be an augmented reality code. The augmented reality code may be comprised of a pattern of rectangles or other shapes, which represent a specific location or name. The predetermined object may be a quick response (QR) code.

At act S107, the desktop application generates an image attribute indicative of the predetermined object. The image attribute may be text of a business name or other point of interest. The image attribute may be a hyperlink, internet address, or physical address of the business or other point of interest.

At act S109, the desktop application stores the image attribute in the file location. Because the image attribute is saved in the same location, the cloud service 121 synchronizes the mobile device 121 by forwarding the image attribute to the mobile device 122. The mobile device 121 detects the new image attribute, which may be referred to as metadata. The mobile device 122 combines the new image attribute with the image data to deliver a location based service.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The database 123, the memory 204 and/or the memory 301 may be referred to as a computer readable medium or a non-transitory computer readable medium. While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for providing augmented reality with images collected at a mobile device and supplemented in real time through analysis at a personal computer comprising:
    generating a key at the mobile device;
    receiving, at a communication interface, image data captured by the mobile device, the image data depicting objects in a vicinity of the mobile device;
    encrypting, by the mobile device, the image data in a cloud service format that is inaccessible to a cloud storage service server;
    sending, by the mobile device, the image data in the cloud service format to a cloud storage service server acting as an intermediary between the personal computer and the mobile device, wherein the cloud service format includes an identification value for the mobile device;
    sending the key to a desktop application of the personal computer, wherein the desktop application is configured to access the image data with the key and generate an image attribute and a pixel coordinate;
    receiving, at the mobile device, the image attribute, from the personal computer, for an object in the image data;
    receiving the pixel coordinate, at the mobile device, from the cloud service server as received from the personal computer, that describes a location within the image data of the image attribute,
    wherein the pixel coordinate and the image attribute are determined based on an analysis of the image data performed by the personal computer and sent from the personal computer to the cloud service server; and
    providing, using a processor of the mobile device, at least one location based service based on the image attribute for the image data and the pixel coordinate,
    wherein the personal computer is a user-accessible desktop computer.

2. The method of claim 1, wherein the location based service provides a link to information associated with the object depicted in the image data.

3. The method of claim 1, wherein the location based service provides navigation to the object depicted in the image data.

4. An apparatus for providing augmented reality with images collected at a mobile device and supplemented in real time through analysis at a personal computer, the apparatus comprising:
    at least one processor; and
    at least one memory including computer program code for one or more programs; the at least one memory and the computer program code configured to, with the at least one processor, cause the apparatus to at least:
    generate a key at the mobile device;
    receive, at a communication interface, image data captured by the mobile device, the image data depicting objects in a vicinity of the mobile device;
    encrypt, by the mobile device, the image data in a format that is inaccessible to a cloud storage service server;
    send, by the mobile device, the image data in the cloud service format to a cloud storage service server acting as an intermediary between the personal computer and the mobile device, wherein the cloud service format includes an identification value for the mobile device;
    send the key to a desktop application of the personal computer, wherein the desktop application is configured to access the image data with the key and generate an image attribute and a pixel coordinate;
    receive, at the mobile device, the image attribute, from the personal computer, for an object depicted the image data;
    receive the pixel coordinate, at the mobile device from the cloud service server as received from the personal computer, for a location within the image data of the image attribute, wherein the pixel coordinate and the image attribute are determined based on an analysis of the image data performed by the personal computer and sent from the personal computer to the cloud service server, wherein the personal computer is a user-accessible desktop computer; and
    provide at least one location based service based on the image attribute for the image data and the pixel coordinate.

5. The apparatus of claim 4, wherein the location based service provides a link to information associated with the object depicted in the image data.

6. The apparatus of claim 4, wherein the location based service provides navigation to the object depicted in the image data.

* * * * *